United States Patent [19]
Tsuchihashi

[11] Patent Number: 6,075,452
[45] Date of Patent: Jun. 13, 2000

[54] FIELD APPARATUS AND FIELD BUS SYSTEM AND METHOD OF CONTROLLING FIELD APPARATUS

[75] Inventor: Toshimitsu Tsuchihashi, Hitachinaka, Japan

[73] Assignee: Hitachi, Ltd., Tokyo, Japan

[21] Appl. No.: 09/019,719

[22] Filed: Feb. 6, 1998

[30] Foreign Application Priority Data

Mar. 5, 1997 [JP] Japan .................................. 9-050056

[51] Int. Cl.⁷ .................................................. G05B 23/02
[52] U.S. Cl. .............................. 340/825.07; 340/870.11; 340/870.18; 340/870.38; 370/527; 370/529; 370/204; 375/224
[58] Field of Search ...................... 340/825.07, 870.18, 340/870.11, 870.38; 370/527, 529, 204; 375/224

[56] References Cited

U.S. PATENT DOCUMENTS

| | | | |
|---|---|---|---|
| 4,348,673 | 9/1982 | Richardson | 340/825.18 |
| 5,469,156 | 11/1995 | Kogure | 340/870.38 |
| 5,663,985 | 9/1997 | Kogure | 375/259 |
| 5,835,534 | 11/1998 | Kogure | 375/527 |

*Primary Examiner*—Brian Zimmerman
*Assistant Examiner*—Yves Dalencourt
*Attorney, Agent, or Firm*—Antonelli, Terry, Stout & Kraus, LLP

[57] ABSTRACT

A field apparatus which allows for migration from an analog signal transmission system to a field bus transmission system without a need to change the configuration of the field apparatus and performs a self diagnosis. The field apparatus includes a receiving unit which receives a field bus oriented signal from another apparatus connected to the transmission line, an analog signal transmitting unit which transmits a measured magnitude of a measurement object through the transmission line as an analog signal, a field bus signal transmitting unit which transmits a measured magnitude of a measurement object through the transmission line as a field bus oriented signal, and a switch which selects either the analog signal transmitting unit or the field bus signal transmitting unit which transmits an analog signal or a field bus oriented signal respectively through the transmission line.

22 Claims, 5 Drawing Sheets

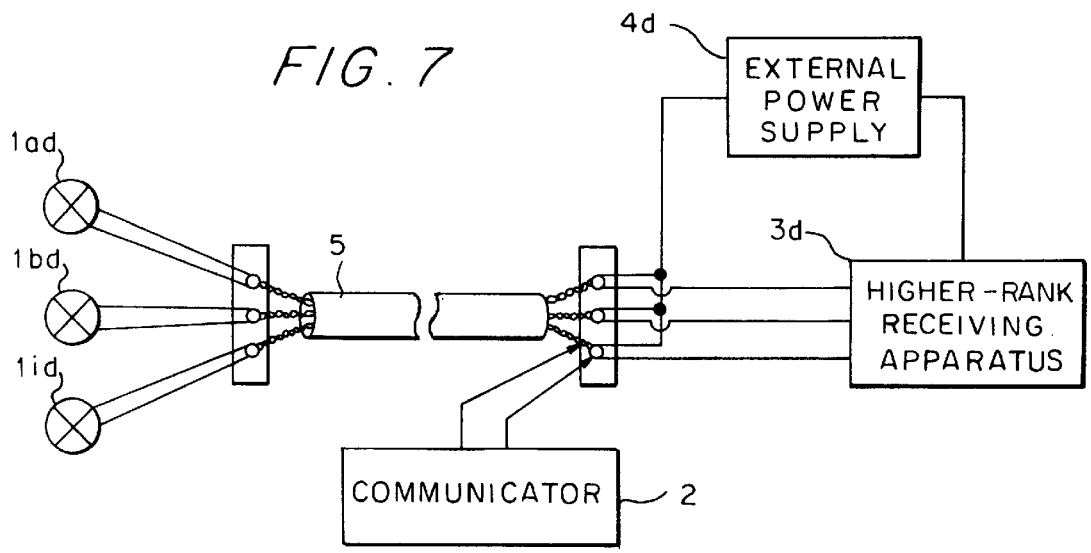
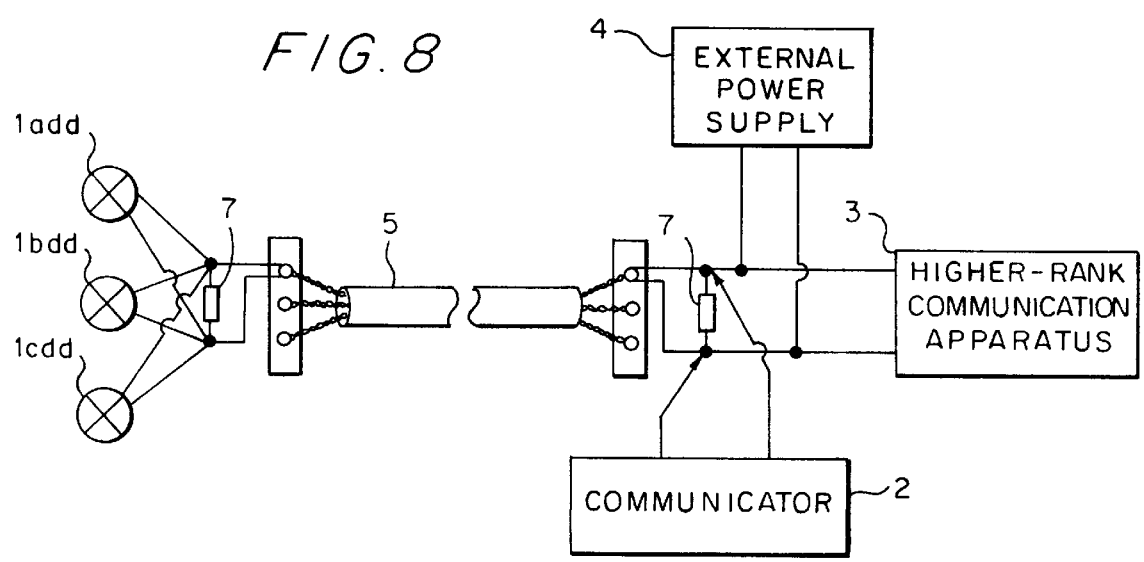

FIELD APPARATUS AND FIELD BUS SYSTEM AND METHOD OF CONTROLLING FIELD APPARATUS

CROSS-REFERENCE TO RELATED APPLICATION

This application is related to application Ser. No. 08/369,299 filed on Jan. 6, 1995, now is a U.S. Pat. No. 5,717,385 by M. Kogure entitled "Field Bus System and Virtual Field Apparatus," commonly assigned with the present invention, the contents of which are incorporated herein by reference.

BACKGROUND OF THE INVENTION

The present invention generally relates to a field apparatus for transmitting a signal through a pair of transmission lines. In particular, the present invention relates to a field apparatus that allows easy transition from an analog signal transmission system to a field bus transmission system.

Normally, the so-called field apparatus means equipment for detecting physical quantities such as a pressure, a temperature and a fluid delivery rate at a plant, then converting the magnitude of the quantity into an electrical signal and finally transmitting the electrical signal to a higher-rank apparatus through a transmission line as well as for reversely receiving a control signal from the higher-rank apparatus and controlling a valve or another device at the plant in accordance with the control signal.

In the case of an electrical signal transmitted as an analog signal, the transmission of the electrical signal conforms to certain standards. That is to say, the transmitted analog electrical signal which is referred to hereafter simply as an analog signal has to be in the range 4 to 20 mA DC. In addition, the analog signal is generally communicated between the field apparatus and a higher-rank apparatus in one direction.

By virtue of the progress in semiconductor integrated circuit technology made in recent years, however, a field apparatus employing an embedded microprocessor has been developed and put to practical use. As a result, it is now possible to communicate digital signals in both directions in addition to the communication of an analog signal in one direction through the transmission line described above and to set the range of the field apparatus as well as carry out self diagnoses on the field apparatus by using commands transmitted from a remote location.

Examples of an intelligent field apparatus of this type are disclosed for example in Japanese Patent Laid-open No. Sho 58-48198 and Japanese Patent Laid-open No. Sho 59-201535.

A concrete example is explained by referring to FIG. 7. FIG. 7 is a diagram showing an analog signal transmission system employing analog signal oriented field apparatuses and an intelligent field apparatus.

The operations of the analog signal oriented field apparatuses 1$ad$ and 1$bd$ and the intelligent field apparatus 1$id$ employed in the transmission system shown in FIG. 7 are driven by electric power supplied by an external power supply 4$d$. Detected physical quantities are each converted thereby into an electrical current which is then transmitted as an analog signal through a transmission line 5.

In a higher-rank receiving apparatus 3$d$, the current flows through a resistor connected in series to the transmission line 5. The analog signal is detected by the higher-rank receiving apparatus as a difference in potential between the ends of the resistor which is not shown in the figure. The analog signal is received as a quantity transmitted by the field apparatus 1$ad$, 1$bd$ or 1$id$.

Installed between the intelligent field apparatus 1$id$, the higher-rank communication apparatus 3$d$ and the external power supply 4$d$, a communicator 2 is used for facilitating communication between the intelligent field apparatus 1$id$ and the higher-rank communication apparatus 3$d$ in both directions.

A system of transmitting a digital signal by superposition of the digital signal on an analog signal without affecting the analog signal, a system of signal transmission by switching from analog to digital and vice versa and a system of transmission by transmitting only a digital signal are commonly known as systems for transmitting signals through the transmission line 5.

In addition, a field bus transmission system has been proposed recently as a system for exchanging digital signals only in both directions to and from a plurality of field apparatuses connected to a common transmission line.

A representative example of the configuration of the field bus system is explained by referring to FIG. 8. FIG. 8 is a diagram showing a typical configuration of the field bus transmission system.

As shown in the figure, a plurality of field apparatuses are connected to a higher-rank communication apparatus by a common transmission line to form a tree like shape.

Driven by electric power supplied by an external power supply 4 through a transmission line 5, field apparatuses 1$add$, 1$bdd$ and 1$cdd$ operate, exchanging digital signals in turn with a higher-rank communication apparatus 3 also through the transmission line 5 in both directions in processing to transmit detected physical quantities and to receive control values to and from the higher-rank communication apparatus 3.

Provided between the field apparatuses 1$add$, 1$bdd$ and 1$cdd$, the higher-rank communication apparatus 3 and the external power supply 4, a communicator 2 is used for facilitating the exchanging of the digital signals between the field apparatuses 1add, 1bdd and 1cdd and the higher-rank communication apparatus 3 in both directions. A terminator 7 provided at each end of the transmission line 5 comprises a resistor and a capacitor connected to each other in series.

In order to migrate from the transmission system shown in FIG. 7 to the field bus transmission system shown in FIG. 8, it is necessary to replace the field and higher-rank communication apparatuses by those designed for the latter system. However, the migration from one system to another can be accomplished with ease, because the transmission line 5 can be used as it is. In addition, since the number of field apparatuses connected to the transmission line 5 in the field bus transmission system shown in FIG. 8 can be increased, the system can be expanded easily.

When migrating from an analog signal transmission system to a field bus transmission system, however, it is necessary to change everything except the transmission line 5 at once. As a result, an effort to use of a field bus transmission system is not commensurate with as many merits as expected by the user when seen from the cost performance point of view.

In order to solve this problem, a virtual field apparatus was developed as disclosed in Japanese Patent Laid-open No. Hei 4-195500. The virtual field apparatus is designed so that the existing analog signal oriented field apparatus can be used as it is even if a migration is made from an analog signal transmission system to a field bus transmission system.

That is to say, in a migration from an analog signal transmission system to a field bus transmission system, the virtual field apparatus is provided between the transmission line 5 and a plurality of existing analog signal oriented field apparatuses. Analog signals output by the analog signal oriented field apparatuses are converted into digital signals by the virtual field apparatus and then undergo predetermined signal processing before being transmitted through the transmission line 5.

By adding one virtual field apparatus having such functions, a plurality of existing analog signal oriented field apparatuses can be used in a field bus transmission system.

In the event of a failure occurring in a virtual field apparatus disclosed in Japanese Patent Laid-open No. Hei 4-195500 due to some reason, however, it is quite within the bounds of probability that a plurality of analog signal oriented apparatuses connected to the virtual field apparatus can not all be used.

In addition, a period during which effects of the introduction of a virtual field apparatus can be obtained is limited to a period to migrate from an analog signal transmission system to a field bus transmission system. In addition, functions that a field bus oriented field apparatus is capable of implementing such as autonomous control of distribution of tasks among field apparatuses, preventive maintenance and retrieval of apparatus information like self diagnosis results can not be executed by the virtual field apparatus.

SUMMARY OF THE INVENTION

It is an object of the present invention to provide a field apparatus that have functions equivalent to those of a field bus oriented field apparatus and is capable of keeping up with migration from an analog signal transmission system to a field bus transmission system without the need for changing the configuration of each apparatus.

It is another object of the present invention to provide a field apparatus that allows another apparatus, connected to a transmission line, to be used even if a failure of the field apparatus occurs.

The present invention provides a field apparatus, connected to a transmission line capable of communicating with another apparatus connected to the transmission line in both directions, having; (1) an analog signal transmitting unit which transmits a measured magnitude of a measurement object through the transmission line as an analog signal; (2) a field bus signal transmitting unit which transmits a measured magnitude of a measurement object through the transmission line as a field bus oriented signal; and (3) a switch which selects either the analog signal transmitting unit or the field bus signal transmitting unit for transmitting an analog signal or a field bus oriented signal respectively through the transmission line.

Since the field apparatus provided by the present invention has both an embedded signal transmitting unit for an analog signal transmission system and an embedded signal transmitting unit for a field bus transmission system as well as a switch for switching the field apparatus from the signal transmitting unit for an analog signal transmission system to the signal transmitting unit for a field bus transmission system, the field apparatus can be used after migration from an analog signal transmission system to a field bus transmission system even if the field apparatus has once been built in the analog signal transmission system without the need to replace the field apparatus by another one.

By setting the field apparatus at the factory for use by connection to an analog signal transmission system so that an initial operation at a power on time is carried out by the field apparatus in a mode for outputting an analog signal which is referred to hereafter as an analog signal mode, an analog signal in the range 4 to 20 mA representing a measured magnitude of a measurement object is generated and output to the transmission line through the analog signal transmitting unit.

In addition, a transition is made from an analog signal transmission system to a field bus transmission system typically when a field bus signal is received by the receiving unit included in the present field apparatus from a higher-rank apparatus connected to the present field apparatus by the transmission line in which case the transmission system is immediately switched over to a mode for outputting a field bus signal referred to hereafter as a field bus mode to execute field bus communications.

In this way, a field bus oriented field apparatus can be introduced whenever necessary to a system kept in a state allowing any existing analog signal oriented field apparatus to operate so that at the time of migration to a field bus transmission, at least, a field bus transmission system can be implemented by merely replacing the higher-rank apparatus and the external power supply that match the field bus transmission system.

According to the present invention, the field apparatus is capable of keeping up with migration from an analog signal transmission system to a field bus transmission system without a need to change the configuration thereof and, at the same time, capable of implementing functions equivalent to those of a field bus oriented field apparatus. In addition, the field apparatus can be used in an existing analog signal transmission system by keeping the analog signal transmission system in a state of functioning normally so that, by introducing field bus oriented field apparatuses gradually one after another as required, migration to a field bus transmission system can be accomplished later with ease.

BRIEF DESCRIPTION OF THE DRAWINGS

The present invention will be more apparent from the following detailed description, when taken in conjunction with the accompanying drawings, in which:

FIG. 7 is a diagram illustrating an analog signal transmission system including conventional analog signal oriented field apparatuses and a conventional intelligent field apparatus; and FIG. 8 is a diagram illustrating a field bus transmission system including conventional analog signal oriented field apparatuses.

DETAILED DESCRIPTION OF THE PREFERRED EMBODIMENTS

The present invention will become more apparent from a study of detailed description of some preferred embodiments with reference to the accompanying diagrams.

Figure 1:
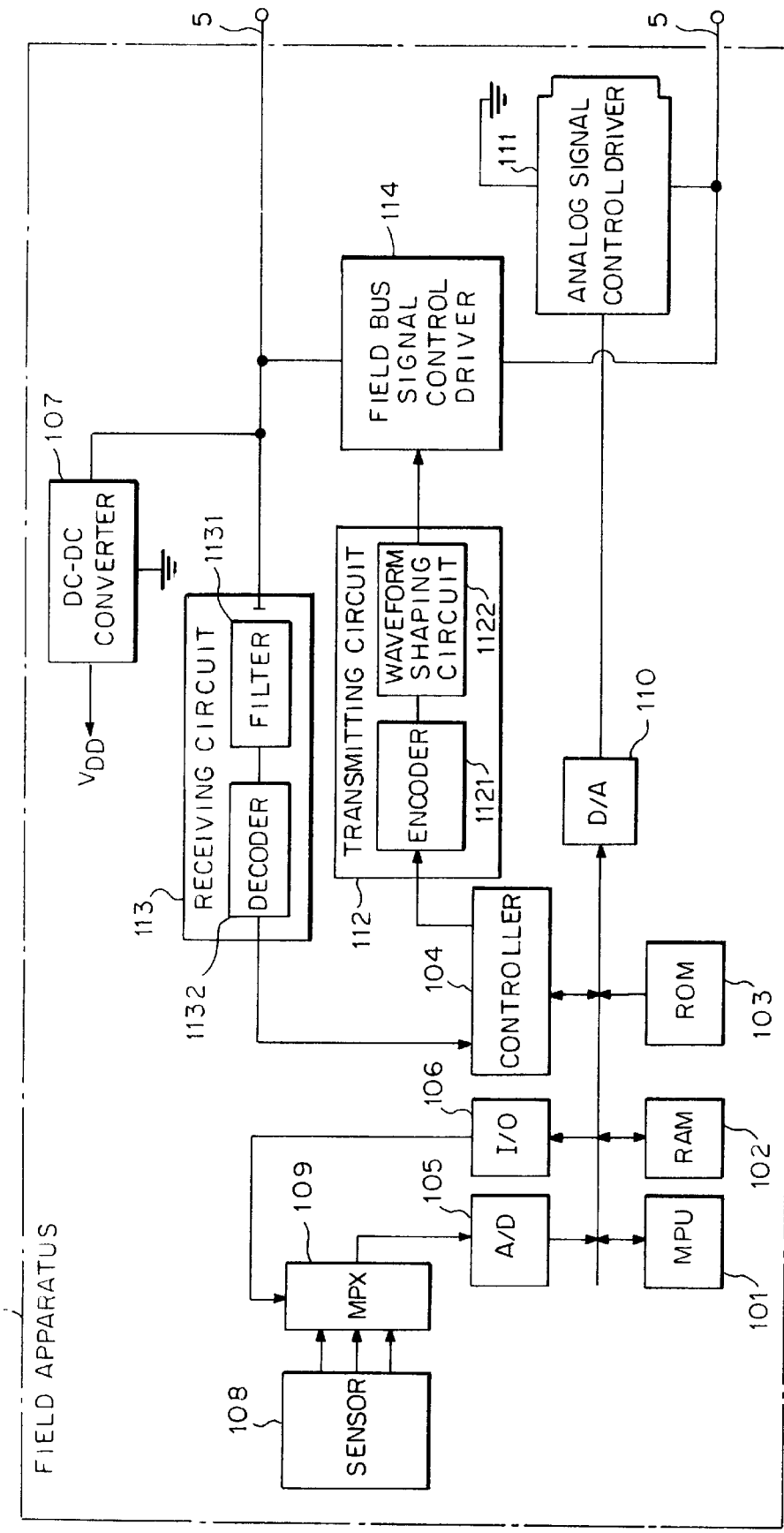
FIG. 1 is a block diagram illustrating a configuration of a field apparatus in accordance with present invention.
Figure 2:
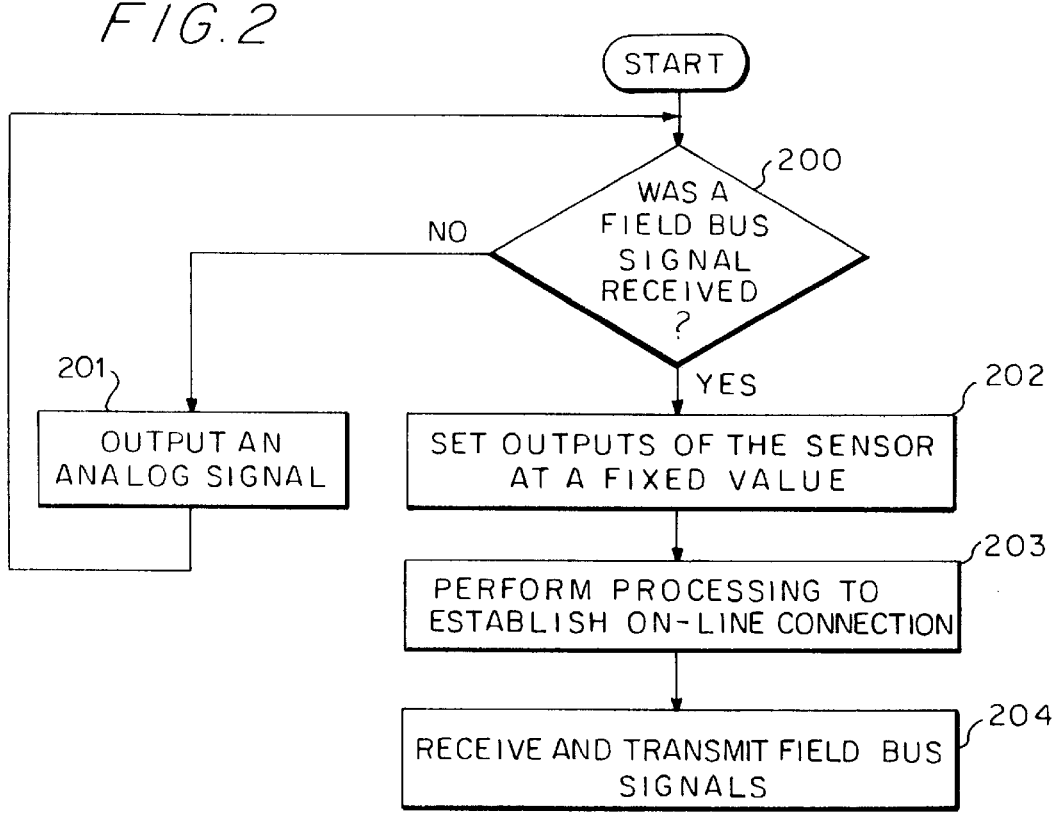
FIG. 2 is a flowchart illustrating operations carried out in a transition from an analog signal transmission system to a field bus transmission system in accordance with the present invention.

FIG. 1 is a block diagram showing the configuration of a field apparatus implemented by a first embodiment of the present invention and FIG. 2 is a flowchart showing operations carried out by the field apparatus in a transition from an analog signal transmission system to a field bus transmission system.

First of all, operations of the field apparatus implemented by the first embodiment are explained by referring to FIG. 1. It should be noted that the field apparatus 1 connected to a transmission line 5 is a field bus oriented apparatus that is capable of communicating in both directions with other apparatuses connected to the transmission bus 5 such as another field apparatus and a higher-rank communication apparatus.

(1) Operations of the Field Apparatus 1 when Connected to an analog Signal Transmission System A DC—DC converter 107 is used for generating a voltage VDD required for the operation of the field apparatus 1 itself from a voltage supplied by the external power supply through the transmission line 5. Outputs (measured magnitudes of measurement objects) of a compound sensor 108 are supplied to a multiplexer 109. A signal generated by an I/O interface unit 106 is used for requesting the multiplexer 109 to select one of the measurement objects and supply a signal representing the measured magnitude of the selected one to an A/D converter 105.

A microprocessor 101 receives signals output by the A/D converter 105 sequentially one after another and performs correction on the signals by using a variety of coefficients stored in RAM and ROM units 102 and 103 in order to find correct values which are then stored in the RAM unit 102.

When no field bus signals are supplied from the transmission line 5 to the microprocessor 101 by way of a receiving circuit 113 and a controller 104 employed in the field apparatus 1, the field apparatus 1 is judged connected to an analog signal transmission system.

In this case, the microprocessor 101 transfers the correct values of the measurement objects originated by the compound sensor 108 from the RAM unit 102 to a D/A converter 110. The D/A converter 110 converts each of the correct digital values representing the quantities measured by the compound sensor 108 into a direct current voltage signal which is then supplied to an analog signal control driver 111. The D/A converter 110 and the analog signal control driver 111 compose an analog signal transmitting unit.

The analog signal control driver 111 converts the direct current voltage signal supplied thereto into a direct current signal proportional in magnitude to the direct current voltage signal. In this way, the correct value of each quantity measured by the compound sensor 108 is eventually converted into a direct current signal in the range 4 to 20 mA which is transmitted to the transmission line 5.

In this case, since the field apparatus 1 is operating in an analog signal mode, under control by the microprocessor 101, no signal is output to a field bus transmitting unit 112 and, hence, no signal is supplied to a field bus signal control driver 114.

(2) Switching the Interface of the Field Apparatus 1 From the Analog Signal Mode to a Field Bus Mode The field apparatus 1 is connected to the transmission line 5 and put in an operative state by electric power received from the external power supply received through the transmission line 5. In this state, when a field bus signal such as a command signal is supplied to the field apparatus 1 from the higher-rank communication apparatus or another field apparatus, the microprocessor 101 judges that the field apparatus 1 is connected to a field bus system.

That is to say, the microprocessor 101 continuously monitors the communication state on the transmission bus 5 through the receiving circuit 113 and the controller 104. The receiving circuit 113 for receiving a field bus signal includes a filter 1131 having a high transmittance only for a field bus signal, cutting off transmission noise and all communication signals other than a field bus signal. In addition, the receiving circuit 113 for receiving a field bus signal includes a decoding circuit 1132 for decoding a received signal. To be more specific, the decoding circuit 1132 converts a coded signal such as a Manchester-coded signal into a serial data fetched as a train of digital signals, supplying the data comprising the train of digital signals "1" and "0" to the controller 104.

The signal supplied to the controller 104 is fetched by the microprocessor 101 as received data. If the received data is verified by the microprocessor 101 to be indeed a field bus signal, the values output by the compound sensor 108 in a signal format of the analog signal mode are converted into such fixed output values that bring the current consumed by the field apparatus to a field bus specification value.

In this way, execution of field bus transmission operations is started.

(3) Operations of the Field Apparatus 1 when Connected to a Field Bus Transmission System Much like the operations carried out by the field apparatus 1 when connected to an analog signal transmission system, the microprocessor 101 receives signals output by the compound sensor 108 by way of the A/D converter 105 sequentially one after another and performs correction on the signals in order to find correct values which are then stored in the RAM unit 102.

The transmission operation is started by a command provided by the microprocessor 101 to output, among other things, data stored in the RAM unit 102 as a train of serial digital signals from the controller 104.

The microprocessor 101 further supplies digital signals representing values output by the compound sensor 108 to the field bus transmitting circuit 112 by way of the controller 104 by following a field bus communication procedure. A coding circuit 1121 included in the field bus transmitting circuit 112 carries out predetermined processing on these signals such as encoding and the processed signals are supplied to a waveform shaping circuit 1122 also included in the filed bus transmitting circuit 112. The signals are then supplied to the field bus signal control driver 114 for transmission through the transmission line 5. The field bus transmitting circuit 112 and the field bus signal control driver 114 constitute a field bus signal transmitting unit.

Here, as a technique for coding signal in the field bus transmitting circuit 112, typically, a method for converting a base band signal into a Manchester code can be adopted. As for a technique for driving a signal in the field bus signal control driver 114, a method for outputting a signal as a voltage or current signal can be adopted.

In a field bus mode, the microprocessor 101 provides a command to set inputs to the D/A converter 110 at a fixed value and, hence, to fix the magnitude of a current output by the analog signal control driver 111 so that the amount of current consumed by the field apparatus 1 agrees with a prescribed value. As a result, even with the analog signal control driver Ill connected to the transmission line 5 as it is, there is no effect on the field bus communication.

In a receiving operation, as described above, a communication signal from the transmission line 5 is supplied to the receiving circuit 113 for carrying out a decoding process on the communication signal. The receiving circuit 113 converts the coded communication signal into a serial data generated as a train of digital signals, supplying the data comprising the train of digital signals "1" and "0" to the controller 104. The microprocessor 101 then fetches the digital data supplied to the controller 104 as received data.

FIG. 2 is a flowchart showing operations carried out in a transition from an analog signal transmission mode to a field bus transmission mode.

As shown in the figure, the flowchart begins with a step 200 at which the microprocessor 101 forms a judgment as to whether or not a field bus signal has been received from the transmission line 5 through the receiving circuit 113 and the controller 104. If a field bus signal has not been received, the flow of operation goes on to a step 201. At the step 201, the microprocessor 101 outputs a detected signal received from the compound sensor 108 to the transmission line 5 as an analog signal. The flow of operation then returns to the step 200.

If the result of the judgment formed by the microprocessor 101 at the step 200 indicates that a field bus signal has been received, on the other hand, the flow of operation proceeds to a step 202. At the step 202, the microprocessor 101 sets inputs to the D/A converter 110 at a fixed value in order to fix the magnitude of a current output by the analog signal control driver 111 so as to make the amount of current consumed by the field apparatus 1 agree with a prescribed value.

Then, the flow of operation continues to a step 203 at which the field apparatus 1 carries out processing to establish on-line connection with the higher-rank communication apparatus by following a field bus communication procedure. The processing is carried out to let the higher-rank communication apparatus and other field apparatuses recognize the connection of the field apparatus 1 to the field bus transmission system. The flow of operation then goes on to a step 204 at which the field apparatus 1 carries out a receiving operation in a field bus mode by following the field bus communication procedure.

It should be noted that the microprocessor 101 can be set to make the field apparatus 1 always carry out operations in an analog signal mode upon power recovery following a cut off of the supplying of electrical power by the external power supply without regard to the operating mode prior to the power cut off. In this way, if it is necessary for the field apparatus 1 to make a transition from the a field bus mode to an analog signal mode, such mode switching can be executed upon power recovery following a cut off of the supplying of electrical power by the external power supply to the field apparatus 1.

It should be noted that, in such a case, the operation of the field apparatus 1 is always switched to an analog signal mode upon power supply recovery even if the field apparatus 1 was operating in a field bus mode prior to the cutting off of the external power supply. However, typically by letting the microprocessor 101 carry out a memory saving operation in the event of a power supply cut off, information such as set data prevailing immediately before the power supply cut off can be saved into the RAM unit. In this way, as soon as a field bus signal is received from the higher-rank communication apparatus after the recovery of the external power supply, the microprocessor 101 can restore the saved information including the set data, returning to the field bus mode, the operating mode prior to the power supply cut off.

Figure 3:
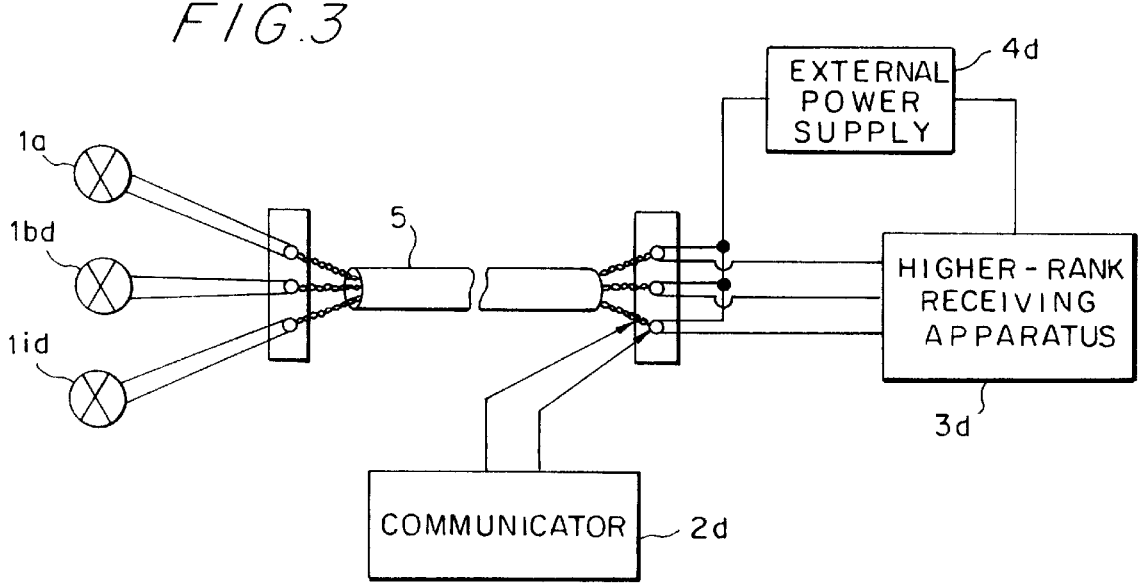
FIG. 3 is a diagram illustrating a general configuration of an analog signal transmission system including the field apparatus in accordance with the present invention.
Figure 4:
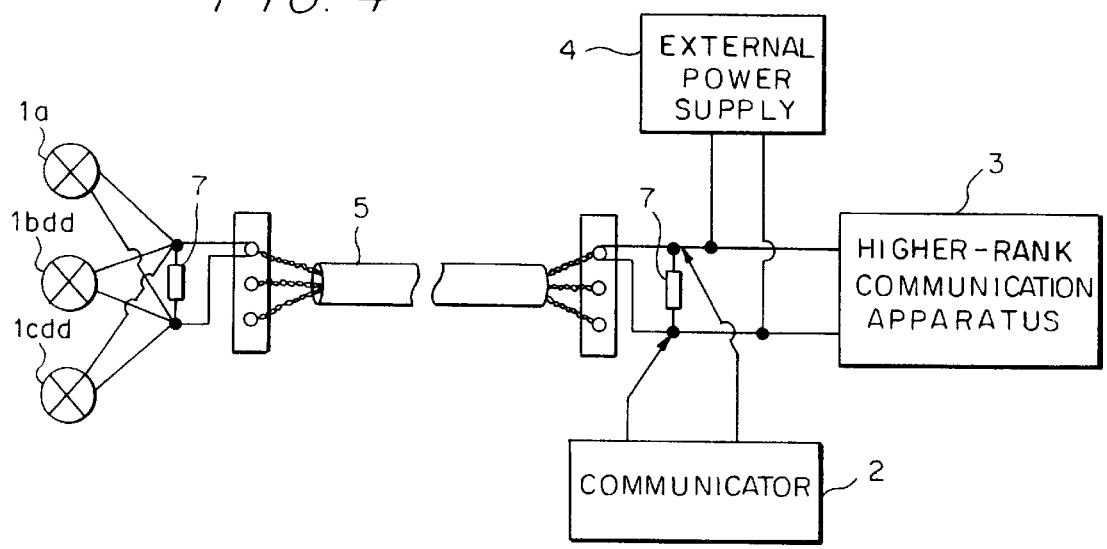
FIG. 4 is a diagram illustrating a typical general configuration of a field bus transmission system including the field apparatus in accordance with the present invention.
Figure 5:
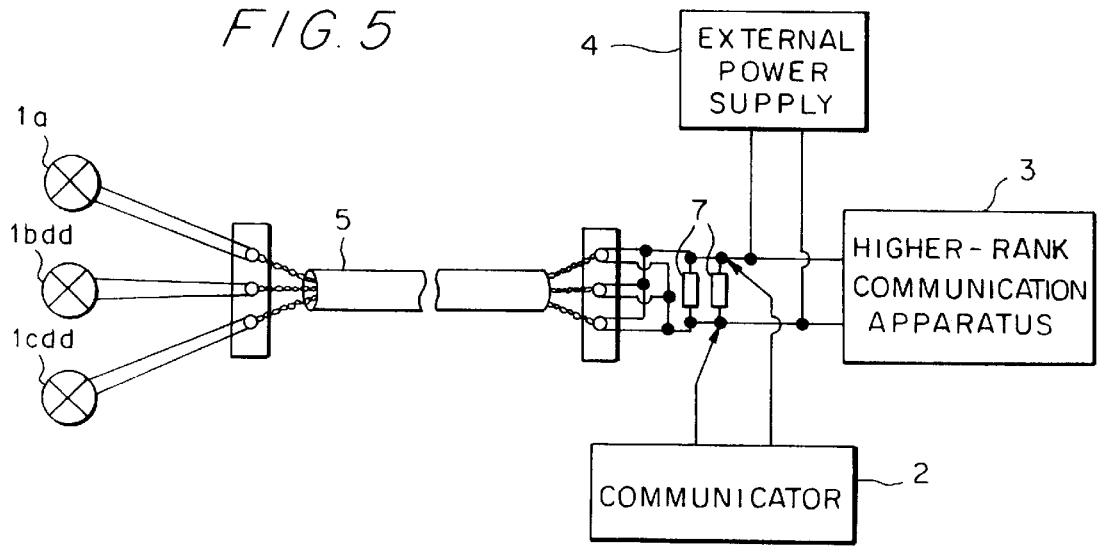
FIG. 5 is a diagram illustrating another typical general configuration of a field bus transmission system including the field apparatus in accordance with the present invention.

FIGS. 3 to 5 are each a diagram showing a general configuration of an analog signal transmission system or a field bus transmission system including a field apparatus in accordance with the present invention.

First of all, the transmission system shown in FIG. 3 is explained. FIG. 3 is a diagram showing a general configuration of an analog signal transmission system including a field apparatus implemented by a first embodiment of the present invention. In the figure, a field apparatus la denotes the field apparatus implemented by the first embodiment and field apparatus 1bd is an analog signal oriented field apparatus. A field apparatus 1bd is an intelligent field apparatus. In the configuration shown in FIG. 3, the field apparatus provided by the present invention can be used as it is without the need to make some modifications to the analog signal transmission system. It should be noted that details of the configuration and the operation of each of the other field apparatuses are the same as the conventional ones shown in FIG. 7.

FIG. 4 is a diagram showing a typical general configuration of a field bus transmission system resulting from migration from the analog signal transmission system shown in FIG. 3. To put it in detail, field bus oriented field apparatuses lbdd and lcdd shown in FIG. 4 are used as substitutes for the field apparatuses lbd and lid shown in FIG. 3 respectively. The field apparatus la provided by the present invention remains in the field bus transmission system.

The migration from the analog signal transmission system shown in FIG. 3 to the field bus transmission system shown in FIG. 4 includes replacement of equipment such as the higher-rank communication apparatus 3d by a new higher-rank communication apparatus 3. The field apparatus 1a provided by the present invention can be used in the field bus transmission system as it is except for wiring changes including addition of a new terminator 7.

FIG. 5 is a diagram showing another typical general configuration of a field bus transmission system resulting from migration from the analog signal transmission system shown in FIG. 3. The configuration shown in FIG. 5 has wiring different from that of the configuration shown in FIG. 4. To put it in detail, the wiring of the configuration shown in FIG. 4 forms a tree like shape while, in the configuration shown in FIG. 5, the field apparatuses 1a, 1bdd and 1cdd are connected to a junction provided in the higher-rank communication apparatus 3 by a cable 5 to form a wiring topology having star like shape.

Also in the configuration shown in FIG. 5, the field apparatus 1a provided by the present invention can be used in the field bus transmission system without modifying the connection on the field apparatus side.

As described above, the field apparatus 1 implemented by the first embodiment of the present invention operates in an analog signal mode when no field bus signal is received from the transmission line 5 and, as soon as a field bus signal is received, the detection of the signal causes the apparatus to operate in a field bus mode. As a result, the field apparatus 1 is capable of keeping up with migration from an analog signal transmission system to a field bus transmission system without a need to change the configuration thereof and, at the same time, capable of implementing functions equivalent to those of a field bus oriented field apparatus.

It should be noted that, in the first embodiment described above, a portion connecting the field bus signal control driver 114 and the transmission line 5 can be implemented by an analog switching circuit employing transistors wherein, when no signal is supplied to the field bus signal control driver 114, the impedance between the a pair of the transmission line 5 is increased to a sufficiently great value by the field bus signal control driver 114.

With such a scheme, in an analog signal mode, the field bus signal control driver 114 does not have any effect on outputs to the transmission line 5 by the field bus signal control driver 111 even if the field bus signal control driver 114 is connected to the transmission line 5 as it is.

Figure 6:
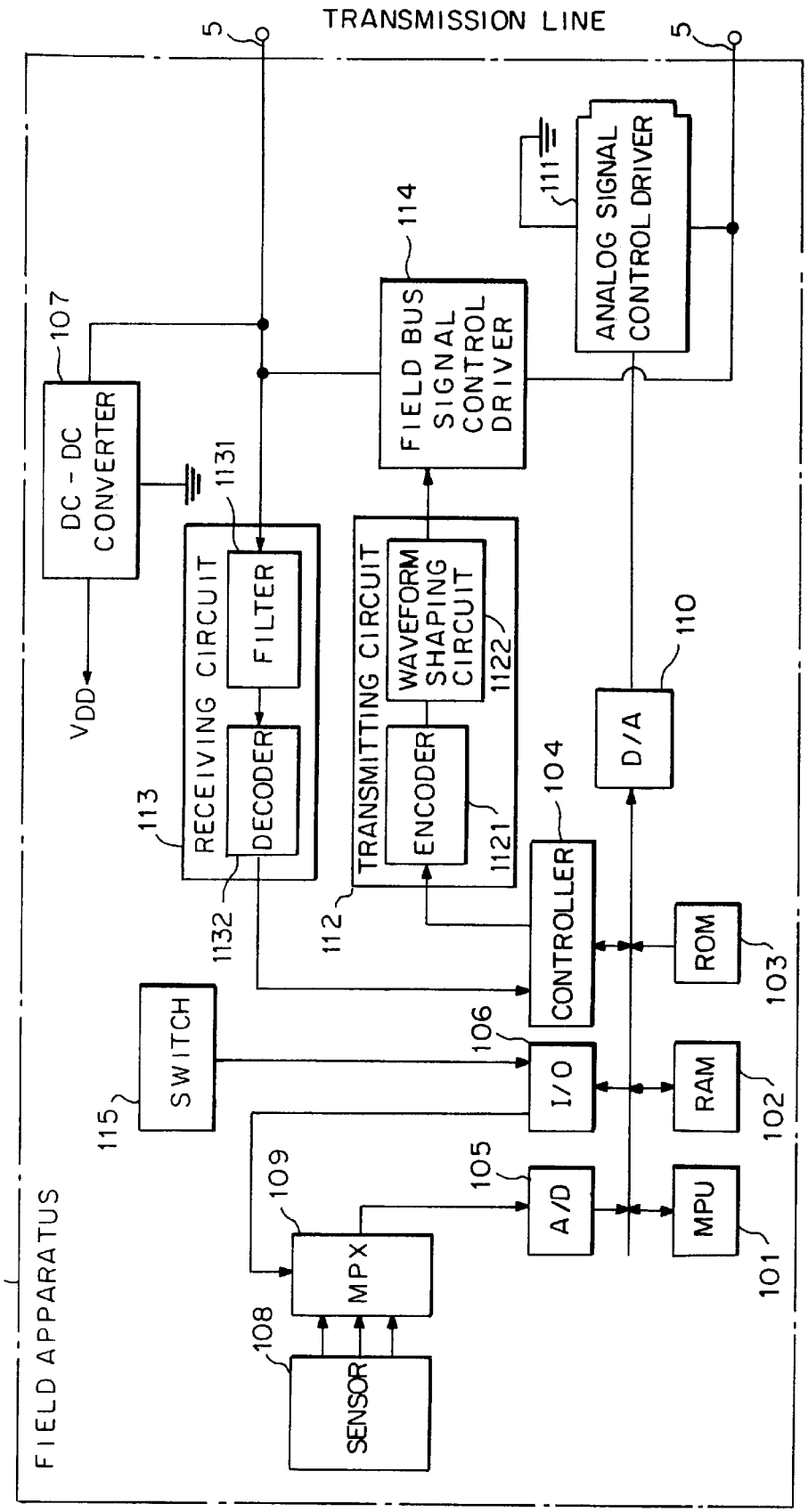
FIG. 6 is a diagram illustrating the configuration of a field apparatus in accordance with the present invention.

FIG. 6 is a diagram showing the configuration of a field apparatus implemented by a second embodiment of the present invention. Components identical with those employed in the first embodiment shown in FIG. 1 are denoted by the same reference numerals used in the latter. The difference between the second and first embodiments is that, the second embodiment is obtained by adding a manual change over switch 115 to the first embodiment. The rest of the configuration shown in FIG. 6 is the same as that shown in FIG. 1.

By supplying a change over signal from the manual change over switch 115 to the microprocessor 101 through the I/O interface unit 106, the operating mode can be changed from an analog signal mode to a field bus mode or vice versa.

To put it in detail, when the manual change over switch 115 is manually operated, the manual change over switch 115 supplies an ON/OFF signal to the microprocessor 101. Detecting the ON/OFF signal, the microprocessor 101 switches over the operating mode of the field apparatus 1 from an analog signal mode to a field bus mode or vice versa, depending on the meaning of the ON/OFF signal which is defined in advance.

Other operations of the second embodiment are the same as those carried out by the first embodiment. Thus, in the case of the second embodiment, the operation to switch over the operating mode from an analog signal mode to a field bus mode is also carried out at the step 200 of the flowchart shown in FIG. 2 except that, at the step 200 in this case, the microprocessor 101 detects the ON/OFF signal from manual change over switch 115. The flow of operation then goes on either to the step 201 or 202 depending upon the outcome of the detection of the ON/OFF signal.

The second embodiment of the present invention also exhibits the same effects as the first embodiment described earlier.

It should be noted that while, in the embodiments described above, the operating mode of the field apparatus provided by the present invention is switched over from an analog signal mode to a field bus mode in accordance with the result of a judgment formed by the microprocessor 101, the description is not to be construed in a limiting sense. That is to say, for example, the judgment can also be formed by a judging circuit provided separately instead of letting the microprocessor 101 form the judgment.

While the present invention has been described in detail and pictorially in the accompanying drawings it is not limited to such details since many changes and modifications recognizable to those of ordinary skill in the art may be made to the invention without departing from the spirit and the scope thereof.

I claim:

1. A field apparatus, connected to a transmission line, for communicating with another apparatus connected to said transmission line, comprising:

an analog signal transmitting unit which transmits a measured magnitude of a measurement object through said transmission line as an analog signal;

a receiving unit which receives a field bus oriented signal from another apparatus connected to said transmission line;

a field bus signal transmitting unit which transmits a measured magnitude of said measurement object through said transmission line as a field bus oriented signal; and a switch which selects either said analog signal transmitting unit or said field bus signal transmitting unit which transmits an analog signal or a field bus oriented signal respectively through said transmission lines, wherein said switch selects said field bus signal transmitting unit which transmits a field bus oriented signal through said transmission line when a field bus oriented signal is received by said receiving unit from another apparatus connected to said transmission line.

2. A field apparatus according to claim 1, wherein said receiving unit includes a filter having a high transmittance only for a field bus signal and cutting off transmission noise and all communication signals other than a field bus signal.

3. A field apparatus according to claim 2, wherein said receiving unit further includes a decoder converting a received coded signal into a serial data fetched as a train of digital signals.

4. A field apparatus according to claim 1, wherein said analog signal transmitting unit includes:

a D/A converter which converts each of correct digital values representing said measured magnitudes by a compound sensor into a direct current voltage signal; and an analog signal control driver which converts said direct current voltage supplied by said D/A converter into a direct current signal.

5. A field apparatus according to claim 1, wherein said field bus signal transmitting unit includes an encoder and a waveform shaping unit.

6. A field apparatus according to claim 1, wherein said other apparatus connected to said transmission line is a field apparatus.

7. A field apparatus according to claim 1, wherein said other apparatus connected to said transmission line is a higher-rank apparatus providing a command signal to said field apparatus.

8. A field apparatus according to claim 1, wherein said switch has a microprocessor embedded in said field apparatus and said microprocessor forms a judgment as to whether or not a field bus oriented signal has been received by said receiving unit from said other apparatus.

9. A field apparatus according to claim 1, wherein said switch has a manual change over switch for manually selecting either said analog signal transmitting unit or said field bus signal transmitting unit which transmits an analog signal or a field bus oriented signal respectively through said transmission line.

10. A field apparatus, connected to a transmission line, for communicating with another apparatus connected to said transmission line, comprising:

a receiving unit which receives a field bus oriented signal from another apparatus connected to said transmission line;

an analog signal transmitting unit which transmits a measured magnitude of a measurement object through said transmission line as an analog signal;

a field bus signal transmitting unit which transmits a measured magnitude of said measurement object through said transmission line as a field bus oriented signal; and a switching means for selecting either said analog signal transmitting unit or said field bus signal transmitting unit for transmitting an analog signal or a field bus oriented signal respectively through said transmission lines, wherein said switching means selects said field bus signal transmitting unit for transmitting a field bus oriented signal through said transmission line when a field bus oriented signal is received by said receiving unit from another apparatus connected to said transmission line.

11. A field apparatus according to claim 10, wherein said receiving unit includes a filter having a high transmittance only for a field bus signal and cutting off transmission noise and all communication signals other than a field bus signal.

12. A field apparatus according to claim 11, wherein said receiving unit further includes a decoder which converts a received coded signal into a serial data fetched as a train of digital signals.

13. A field apparatus according to claim 10, wherein said analog signal transmitting unit includes:

a D/A converter which converts each of correct digital values representing said measured magnitudes by a compound sensor into a direct current voltage signal; and an analog signal control driver which converts said direct current voltage supplied by said D/A converter into a direct current signal.

14. A field apparatus according to claim 10, wherein said field bus signal transmitting unit includes a encoder and a waveform shaping unit.

15. A field apparatus according to claim 10, wherein said other apparatus connected to said transmission line is a field apparatus.

16. A field apparatus according to claim 10, wherein said other apparatus connected to said transmission line is a higher-rank apparatus providing a command signal to said field apparatus.

17. A field system for performing signal transmission, through a pair of transmission lines, between a plurality of field apparatuses which detect physical amounts at a field side of said transmission lines and at least one higher-rank apparatus which monitor said field apparatuses at a higher-rank apparatus side of said transmission lines, said system comprising:

at least one field apparatus including:

a receiving unit which receives a field bus oriented signal from another apparatus connected to said transmission line, an analog signal transmitting unit which transmits said detected physical amounts through said transmission line as an analog signal, a field bus signal transmitting unit which transmits said detected physical amounts through said transmission line as a field bus oriented signal, and a switch which selects either said analog signal transmitting unit or said field bus signal transmitting unit which transmits an analog signal or a field bus oriented signal respectively through said transmission lines, wherein said switch selects said field bus signal transmitting unit which transmits a field bus oriented signal through said transmission line when a field bus oriented signal is received by said receiving unit from another apparatus connected to said transmission line.

18. A field system according to claim 17, wherein said receiving unit includes a filter having a high transmittance only for a field bus signal and cutting off transmission noise and all communication signals other than a field bus signal.

19. A field system according to claim 18, wherein said receiving unit further includes a decoder converting a coded signal, a received signal, into a serial data fetched as a train of digital signals.

20. A method for controlling a field apparatus, connected to a transmission line, for communicating with another apparatus connected to said transmission line, comprising the steps of:

judging whether a field bus signal has been received from said another apparatus through said transmission line or not; and selecting either an analog signal transmitting unit or a field bus signal transmitting unit for transmitting an analog signal or a field bus signal through said transmission line based on said result of said judgment.

21. A method according to claim 20, wherein if said result of said judgment indicates that a field bus signal has not been received, said analog transmitting unit is selected and a measured magnitude of a measurement object is transmitted through said transmission line as an analog signal.

22. A method according to claim 20, wherein if said result of said judgment indicates that a field bus signal has been received, said field bus transmitting unit is selected and a measured magnitude of a measurement object is transmitted through said transmission line as a field bus signal.

* * * * *